US006625206B1

(12) United States Patent
Doblar

(10) Patent No.: US 6,625,206 B1
(45) Date of Patent: Sep. 23, 2003

(54) SIMULTANEOUS BIDIRECTIONAL DATA TRANSMISSION SYSTEM AND METHOD

(75) Inventor: Drew G. Doblar, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/199,858

(22) Filed: Nov. 25, 1998

(51) Int. Cl.$^7$ ................................................ H04B 3/02
(52) U.S. Cl. ..................................... 375/219; 375/257
(58) Field of Search ................................ 375/219, 220, 375/222–288; 370/276, 278, 282

(56) References Cited

U.S. PATENT DOCUMENTS

| | | | | |
|---|---|---|---|---|
| 3,758,719 A | * | 9/1973 | Klose | 370/276 |
| 4,713,827 A | * | 12/1987 | Lauffer et al. | 375/219 |
| 4,941,201 A | * | 7/1990 | Davis | 455/41 |
| 5,469,285 A | * | 11/1995 | Gut | 359/152 |
| 5,661,427 A | | 8/1997 | McBride et al. | |
| 5,670,903 A | | 9/1997 | Mizuno | |
| 5,712,883 A | | 1/1998 | Miller et al. | |
| 5,734,685 A | | 3/1998 | Bedell et al. | |
| 5,905,716 A | * | 5/1999 | Vidales | 370/276 |

* cited by examiner

*Primary Examiner*—Amanda T. Le
(74) *Attorney, Agent, or Firm*—Meyertons Hood Kivlin Kowert & Goetzel, P.C.; B. Noël Kivlin

(57) ABSTRACT

A digital communication system is presented implementing a data transmission method which allows each of a pair of communication devices coupled to a transmission line to both transmit and receive data during each cycle of a clock signal (i.e., simultaneous bidirectional data transmission). The digital communication system includes a first and second communication devices coupled to opposite ends of a transmission line. Both the first and second communication devices operate in response to a periodic clock signal. The first and second communication devices simultaneously: (i) drive an output data signal upon the transmission line during a first portion of a period of the clock signal, and (ii) receive an input signal from the transmission line during a remainder of the period of the clock signal. The communication devices may be coupled to receive the clock signal via a clock signal line, or may include circuitry to generate and synchronize two separate clock signals. One embodiment of an input/output driver circuit is described, along with timing requirements which must be observed in order to achieve simultaneous bidirectional data transmission.

27 Claims, 7 Drawing Sheets

SIMULTANEOUS BIDIRECTIONAL DATA TRANSMISSION SYSTEM AND METHOD

BACKGROUND OF THE INVENTION

1. Field of the Invention

This invention relates to digital communication systems, and more particularly to bidirectional digital data transmission via a single transmission medium.

2. Description of the Relevant Art

Digital electronic devices typically communicate via electrical signals (e.g., voltage and/or current) driven upon electrical conductors (e.g., metal wires). As the operating frequencies (i.e., "speeds") of digital electronic devices increase, electrical conductors used to route signals between components (i.e., signal lines) begin to behave like transmission lines. Transmission lines have characteristic impedances. If the input impedance of a receiving device connected to a transmission line does not match the characteristic impedance of the transmission line, a portion of an incoming signal is reflected back toward a sending device. Such reflections cause the received signal to be distorted. If the distortion is great enough, the receiving device may erroneously interpret the logical value of the incoming signal.

Binary digital signals typically have a low voltage level associated with a logic low (i.e., a logic "0"), a high voltage level associated with a logic high (i.e., a logic "1"), "rise times" associated with transitions from the low voltage level to the high voltage level, and "fall times" associated with transitions from the high voltage level to the low voltage level. A signal line behaves like a transmission line when the signal rise time (or signal fall time) is short with respect to the amount of time required for the signal to travel the length of the signal line (i.e., the propagation delay time of the signal line). As a general rule, a signal line begins to behave like a transmission line when the propagation delay time of the signal line is greater than about one-quarter of the signal rise time (or signal fall time).

Resistive "termination" techniques are often applied to transmission lines, and signal lines long enough to behave like transmission lines, in order to reduce reflections and the resultant signal distortion. One or more electrically resistive elements may be inserted between each sending device and the signal line (i.e., transmission line) in order to cause the effective output impedances of the sending devices to more closely match the characteristic impedance of the transmission line. Similarly, one or more electrically resistive elements may be inserted between each receiving device and the transmission line in order to cause the effective input impedances of the receiving devices to more closely match the characteristic impedance of the transmission line.

Various techniques exist which allow signals to travel in opposite directions along a single electrical path (i.e., bidirectional data transmission). Such bidirectional data transmission techniques may be employed to reduce the total number of electrical conductors required in digital communication systems.

FIG. 1 is a diagram of an exemplary digital communication system 10 employing a bidirectional data transmission technique. Digital communication system 10 includes a first communication device 12a and a second communication device 12b connected to opposite ends of a transmission line 14. Communication devices 12a and 12b are synchronized to drive data signals upon transmission line 14 during alternate periods of the clock signal. Transmission line 14 includes at least two electrical conductors, and may be, for example, a single wire routed above an electrically conductive ground plane, a coaxial cable, or a pair of wires twisted together (i.e., a twisted pair of wires). Communication device 12a includes an input/output (I/O) driver 16a and an I/O terminal 18a connected to one end of transmission line 14. Communication device 12b includes an I/O driver 16b and an I/O terminal 18b connected to the other end of transmission line 14. I/O drivers 16 include circuitry for driving electrical signals upon the respective I/O terminals 18, and for receiving input signals from I/O terminals 18. I/O drivers 16a and 16b operate synchronously in response to a periodic clock signal. Communication devices 12a and 12b may be coupled to receive the clock signal via a clock signal line, or may include circuitry to generate and synchronize two separate clock signals.

FIG. 2 is a diagram illustrating the cyclic nature of the bidirectional data transmission technique employed by digital communication system 10. Each period of the clock signal begins with a transition from a first voltage level "$V_1$" to a second voltage level "$V_2$", where $V_2 > V_1$ (i.e., a rising edge of the clock signal). During a first period of the clock signal (i.e., a first clock cycle) 22, communication device 12a drives a data signal upon transmission line 14 via I/O driver 16a and I/O terminal 18a, and communication device 12b receives the data signal via I/O terminal 18b and I/O driver 16b. During a second clock cycle 24 immediately following first clock cycle 22, communication device 12b drives a data signal upon transmission line 14 via I/O driver 16b and I/O terminal 18b, and communication device 12a receives the data signal via I/O terminal 18a and I/O driver 16a. The data transmission cycle repeats itself as shown in FIG. 2 with communication devices 12a and 12b alternately driving and receiving data.

Transmission line 14 has a characteristic impedance "$Z_O$". In order to reduce signal reflections within transmission line 14, I/O drivers 16a–b drive respective I/O terminals 18a–b with an output resistance equal to $Z_O$, and electrically couple I/O terminals 18a–b to the second voltage level through an electrical resistance equal to $Z_O$ while in a receive mode.

FIG. 3 is a timing diagram illustrating exemplary voltage levels within digital communication system 10 during employment of the bidirectional data transmission technique. At a time "$t_1$" in FIG. 3, the clock signal transitions from the first voltage level "$V_1$" to the second voltage level "$V_2$", beginning a first clock signal period in which communication device 12a drives data upon transmission line 14 and communication device 12b receives the data. During the first clock signal period, communication device 12a is to drive the first voltage level "$V_1$" (e.g., a logic '0') upon transmission line 14 via I/O driver 16a and I/O terminal 18a.

I/O drivers 16a–b cannot drive respective I/O terminals 18a–b immediately, and an output delay time "$t_{OUT}$" results. At a time "$t_2$", delayed from time "$t_1$" by "$t_{OUT}$", I/O driver 16b electrically couples I/O terminal 18b to the second voltage level, and I/O driver 16a drives I/O terminal 18a. As the output resistance of driver 16a is equal to the characteristic impedance "$Z_O$" of transmission line 14, the signal launched upon transmission line 14 by communication device 12a via I/O terminal 18a at time "$t_2$" has a voltage level midway between "$V_1$" and "$V_2$".

A propagation delay time "$t_{PROP}$" is required for a signal to travel from one end of transmission line 14 to the other. At time "$t_3$", delayed from time "$t_2$" by "$t_{PROP}$", the signal launched upon transmission line 14 by communication device 12a at time "$t_2t$" arrives at I/O terminal 18b, and I/O terminal 18b assumes the voltage level midway between "$V_1$" and "$V_2$".

I/O driver 16b compares the voltage level present upon I/O terminal 18b to a reference voltage having a value greater than midway between "$V_1$" and "$V_2$" (e.g., two-thirds the difference between "$V_1$" and "$V_2$"). At a time "$t_4$" following "$t_3$", the clock signal transitions from "$V_1$" to "$V_2$", beginning a second clock signal period. At time "$t_4$" the voltage level present upon I/O terminal 18b is less than the reference voltage, and I/O driver 16b produces and provides voltage level "$V_1$" (e.g., a logic '0') to communication device 12b as the input data signal received from communication device 12a.

During the second clock signal period beginning at time "$t_4$", communication device 12b drives data upon transmission line 14 and communication device 12a receives the data. Specifically, communication device 12b is to drive the first voltage level "$V_1$" (e.g., a logic '0') upon transmission line 14 via I/O driver 16b and I/O terminal 18b. As I/O drivers 16a–b cannot drive respective I/O terminals 18a–b immediately, output delay time "$t_{OUT}$" results. At a time "$t_5$", delayed from time "$t_4$" by "$t_{OUT}$", I/O driver 16b drives I/O terminal 18a to the first voltage level "$V_1$", and I/O driver 16b electrically couples I/O terminal 18a to the second voltage level "$V_2$".

The signal launched upon transmission line 14 by communication device 12b at time "$t_5$" has the first voltage level "$V_1$". At a time "$t_6$", delayed from time "$t_5$" by "$t_{PROP}$", the signal, launched upon transmission line 14 by communication device 12b at time "$t_5$" arrives at; I/O terminal 18a. As I/O driver 16a electrically couples I/O terminal 18a to "$V_2$" through an electrical resistance equal to $Z_O$, and I/O driver 16b drives I/O terminal 18b to "$V_1$" through an electrical resistance equal to $Z_O$, the voltage levels at I/O terminals 18a and 18b stabilize to the voltage level midway between "$V_1$" and "$V_2$" at time "$t_6$".

I/O driver 16a compares the voltage level present upon I/O terminal 18a to the reference voltage. At a time "$t_7$" following "$t_6$", the clock signal transitions from "$V_1$" to "$V_2$", beginning a third clock signal period. At time "$t_7$" the voltage level present upon I/O terminal 18a is less than the reference voltage, and I/O driver 16a produces and provides voltage level "$V_1$" (e.g., a logic '0') to communication device 12a as the input data signal received from communication device 12b.

It would be beneficial to have a data transmission system and method allowing each of a pair of communication devices coupled to a transmission line to both transmit and receive data during each cycle of a clock signal (i.e., simultaneous bidirectional data transmission). Such a data transmission system would potentially double the data transmission rate over the transmission line.

SUMMARY OF THE INVENTION

The problems outlined above are in large part solved by a digital communication system implementing a data transmission method which allows each of a pair of communication devices coupled to a transmission line to both transmit and receive data during each cycle of a clock signal (i.e., simultaneous bidirectional data transmission). The digital communication system includes first and second communication devices coupled to opposite ends of a transmission line. Both the first and second communication devices operate in response to a periodic clock signal. The first and second communication devices simultaneously: (i) drive an output data signal upon the transmission line during a first portion of a period of the clock signal, and (ii) receive an input signal from the transmission line during a remainder of the period of the clock signal. The communication devices may be coupled to receive the clock signal via a clock signal line, or may include circuitry to generate and synchronize two separate clock signals.

The first and second communication devices may include an input/output (I/O) driver circuit. Each I/O driver circuit may include an I/O node operably coupled to the transmission line, an output driver section coupled to the I/O node, and an input section coupled to the I/O node. The output driver section may receive the output data signal from the corresponding communication device and drive the output data signal upon the I/O node during the first portion of the clock signal period. The input section may receive the input signal from the I/O node during the remainder of the clock signal period, produce an input data signal based upon the input signal, and provide the input data signal to the corresponding communication device.

The output driver section may also receive the clock signal from the corresponding communication device. During the first portion of the clock signal period, the output driver section may operate in a "drive" mode, and may drive the output data signal upon the I/O node. During the remainder of the clock signal, the output driver section may operate in a "terminate" mode, and may electrically couple the I/O node to a power supply voltage through an electrical resistance in order to reduce signal reflections within the transmission line.

In one embodiment, the output driver and the input sections of the I/O driver circuit are responsive to periodic transitions in the clock signal from a first voltage level to a second voltage level, wherein the second voltage level is greater than the first voltage level (i.e., rising edges of the clock signal). An output delay time is required for the output driver section to drive the output data signal upon the input/output node, and a propagation delay time is required for a signal to travel from one end of the transmission line to the other. In order for the output data signal driven upon the transmission line by one communication device to reach the other communication device within the first portion of the clock signal period, the first portion of the clock signal period must be greater than or equal to the sum of the output delay time of the output driver section and the propagation delay time of the transmission line.

The input section may require an input "setup" time immediately before each rising edge of the clock signal during which the input signal must be substantially constant at the I/O node. The setup time must be observed in order for the input section to produce the correct input data signal. In this case, the remainder of the clock signal period must be greater than or equal to the setup time of the input section. In addition, the period of the clock signal must be greater than or equal to the sum of the output delay time of the output driver section, the propagation delay time of the transmission line, and the setup time of the input section.

The input section may also require an input "hold" time immediately following the rising edge of the clock signal during which the input signal must be substantially constant at the I/O node. Like the setup time, the hold time must be observed in order for the input section to produce the correct input data signal. In this case, the output delay time of the output driver section must be greater than the hold time of the input section. In addition, in order for the input signal to be substantially constant at the I/O node during the setup and hold times of the input section, the propagation delay time of the transmission line must be greater than the sum of the remainder of the clock signal period and the hold time of the input section.

The present method for achieving simultaneous bidirectional data transmission includes coupling first and second communication devices to opposite ends of a transmission line. The first and second communication devices are configured to operate in response to a periodic clock signal, and to simultaneously: (i) drive an output data signal upon the transmission line during a first portion of a period of the clock signal, and (ii) receive an input data signal from the transmission line during a remainder of the period of the clock signal. Again, the communication devices may be coupled to receive the clock Signal via a clock signal line, or may include circuitry to generate and synchronize two separate clock signals.

The output driver section of the I/O driver circuit may include driver control logic, a first and second switching elements coupled to the I/O node, a first electrical resistance coupled between the first switching element and a first power supply voltage (e.g., $V_{DD}$), and a second electrical resistance coupled between and the second switching element and a second power supply voltage (e.g., $V_{SS}$). The driver control logic may receive the output data signal and the periodic clock signal, and may produce a first and second control signals. The first switching element may be coupled to receive the first control signal, and may electrically couple the I/O node to the first power supply voltage through the first electrical resistance in response to the first control signal. The second switching element may receive the second control signal, and may electrically couple the I/O node to the second power supply voltage through the second electrical resistance in response to the second control signal. The driver control logic may generate the first and second control signals such that the first and second switching elements: (i) drive the output data signal upon the I/O node during the first portion of the clock signal period, and (ii) electrically couple the I/O node to the first power supply voltage through the first electrical resistance during the remainder of the period of the clock signal.

The driver control logic may include timing logic which receives the periodic clock signal and produces an output signal which is asserted for the first portion of the period of the clock signal. The timing logic may be triggered by the periodic rising edges of the clock signal. The driver control logic may generate the first and second control signals in response to the timing logic output signal such that the first and second switching elements: (i) drive the output data signal upon the I/O node when the timing logic output signal is asserted, and (ii) electrically couple the I/O node to the first power supply voltage through the first electrical resistance when the timing logic output signal is deasserted.

The input section of the I/O driver circuit may include a differential amplifier and a memory element. The differential amplifier may have a first input terminal receiving the input signal from the I/O node, and a second input terminal receiving a reference voltage. The differential amplifier may produce an output signal dependent upon a voltage difference between the input signal and the reference voltage. The memory element may receive the differential amplifier output signal and the clock signal. During each rising edge of the clock signal, the memory element may store the differential amplifier output signal and provide the output signal as the input data signal at an output terminal.

BRIEF DESCRIPTION OF THE DRAWINGS

Other objects and advantages of the invention will become apparent upon reading the following detailed description and upon reference to the accompanying drawings in which.

Figure 1:
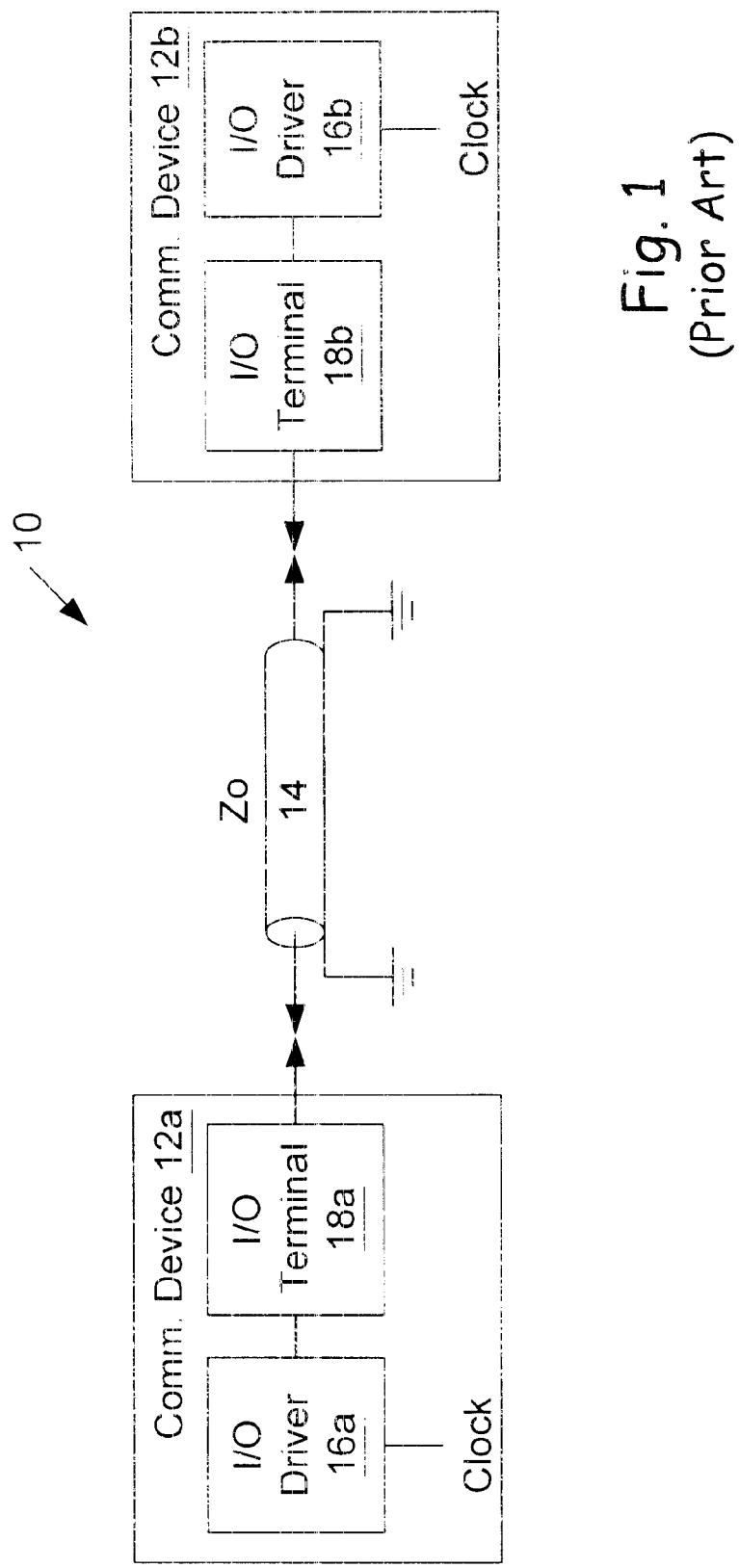
FIG. 1 is a diagram of an exemplary digital communication system employing a bidirectional data transmission technique, wherein the digital communication system includes a pair of communication devices connected to opposite ends of a transmission line, and wherein the communication devices are synchronized to drive data signals upon the transmission line during alternate periods of a clock signal.
Figure 2:
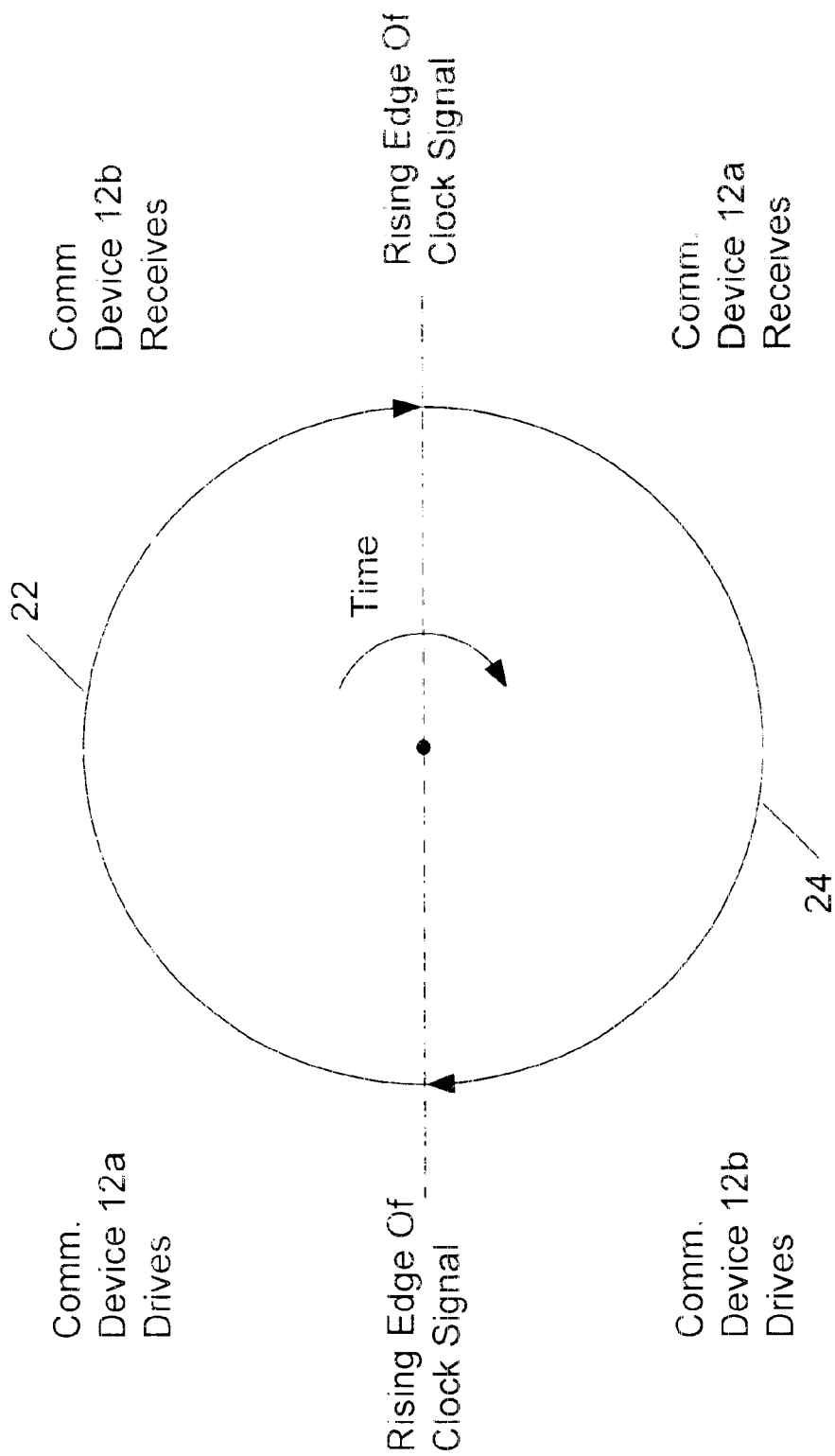
FIG. 2 is a diagram illustrating the cyclic nature of the bidirectional data transmission technique employed by the digital communication system of FIG. 1.
Figure 3:
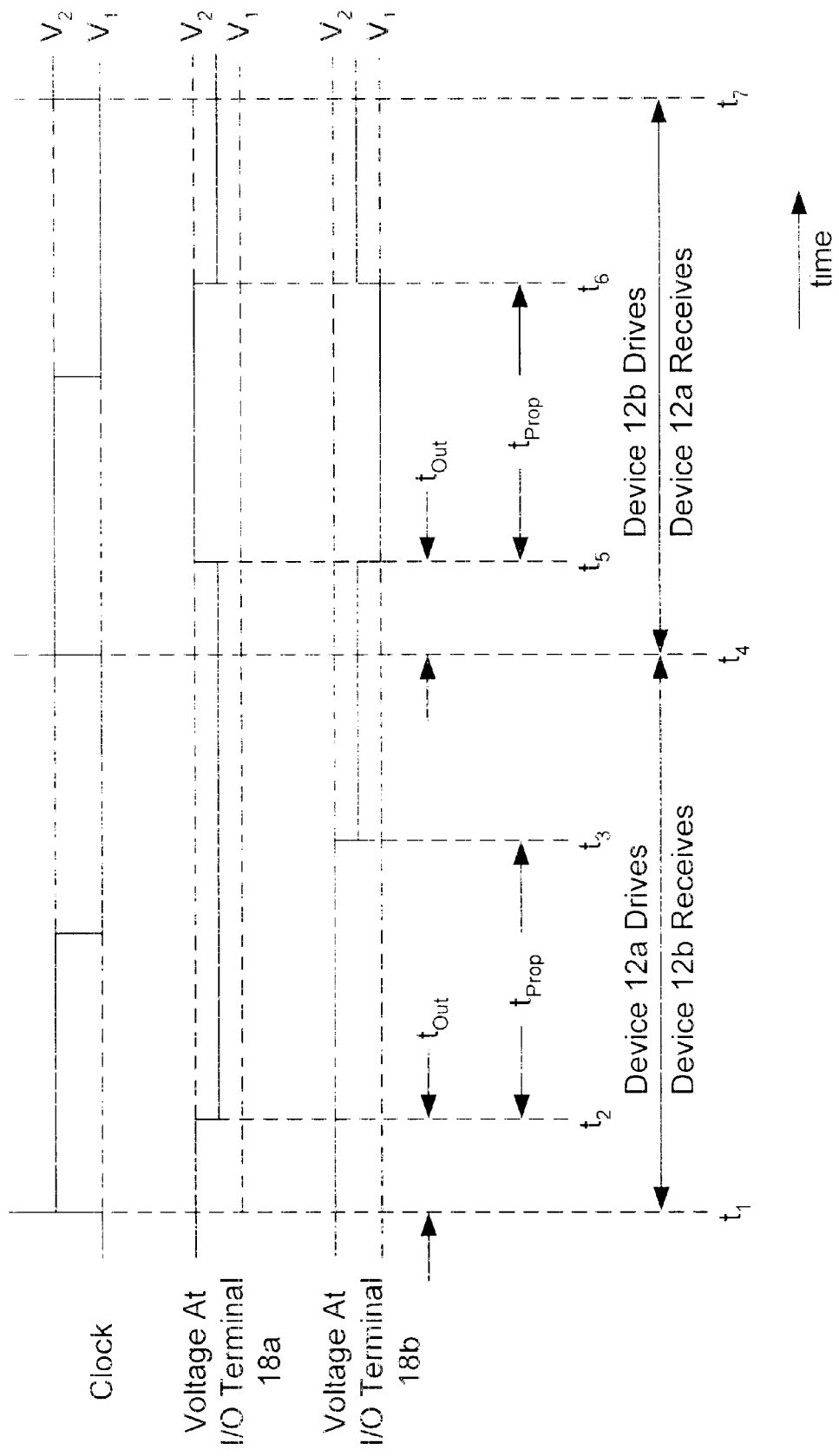
FIG. 3 is a timing diagram illustrating exemplary voltage levels within the digital communication system of FIG. 1.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 4:
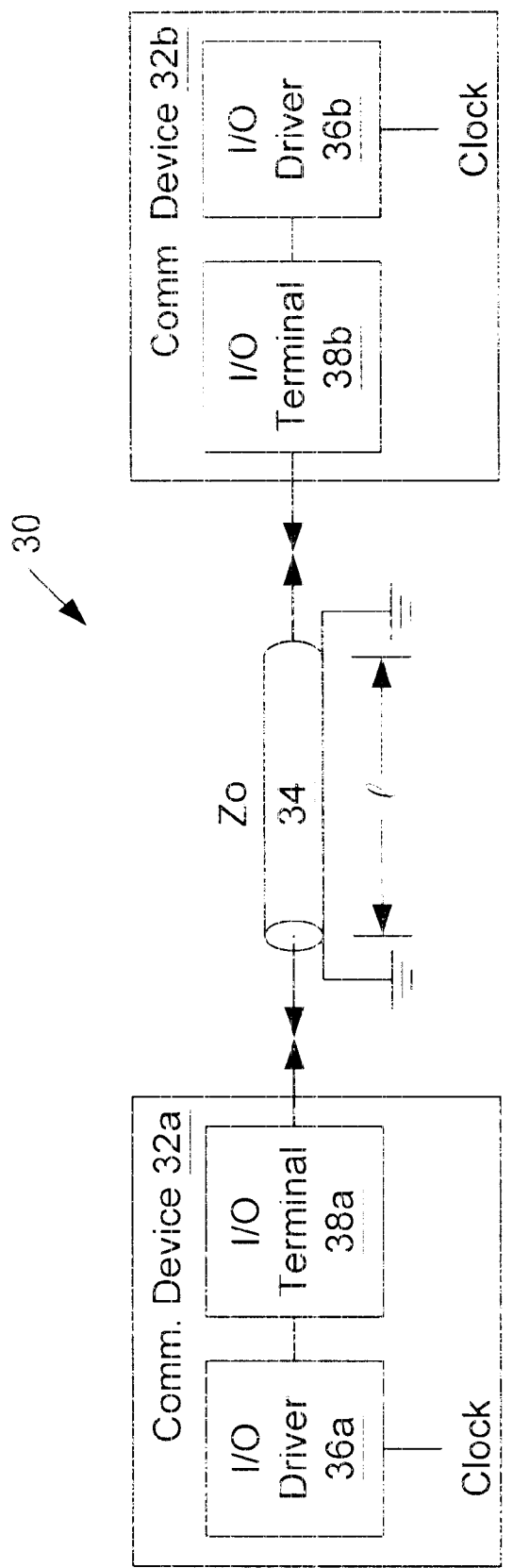
FIG. 4 is a diagram of a digital communication system employing a simultaneous bidirectional data transmission method in accordance with the present invention, wherein the digital communication system includes a pair of communication devices connected to opposite ends of a transmission line, and wherein each communication device includes an input/output (I/O) driver, and wherein the communication devices simultaneously drive data signals upon, and receive data signals from, the transmission line during each period of a clock signal.

FIG. 4 is a diagram of a digital communication system 30 employing a simultaneous bidirectional data transmission method in accordance with the present invention. Digital communication system 30 includes a first communication device 32a and a second communication device 32b connected to opposite ends of a transmission line 34. Communication devices 32a and 32b simultaneously drive data signals upon, and receive data signals from, transmission line 34 during each period of a clock signal.

Communication device 32a includes an input/output (I/O) driver 36a and an I/O terminal 38a connected to one end of transmission line 34. Communication device 32b includes an I/O driver 36b and an I/O terminal 38b connected to the other end of transmission line 34. I/O drivers 36a–b include circuitry for driving electrical signals upon respective I/O terminals 38a–b, and for receiving input signals from respective I/O terminals 38a–b. I/O drivers 36a and 36b operate synchronously in response to the periodic clock signal. Communication devices 32a–b may be coupled to receive the clock signal via a clock signal line, or may include circuitry to generate and synchronize two separate clock signals. Each communication device 32 may be formed upon a monolithic semiconductor substrate, and each I/O terminal 38 may be a rectangular metal pad formed upon a surface of the corresponding substrate.

Transmission line 34 includes at least two electrical conductors, and may be, for example, a single wire routed above an electrically conductive ground plane, a coaxial cable, or a pair of wires twisted together (i.e., a twisted pair of wires). Transmission line 34 has a characteristic impedance "$Z_O$" and a length "l". A signal propagation delay "$t_{PROP}$" is required for a signal to travel from one end of transmission line 34 to the other (i.e., to traverse length "l" of transmission line 34).

Figure 5:
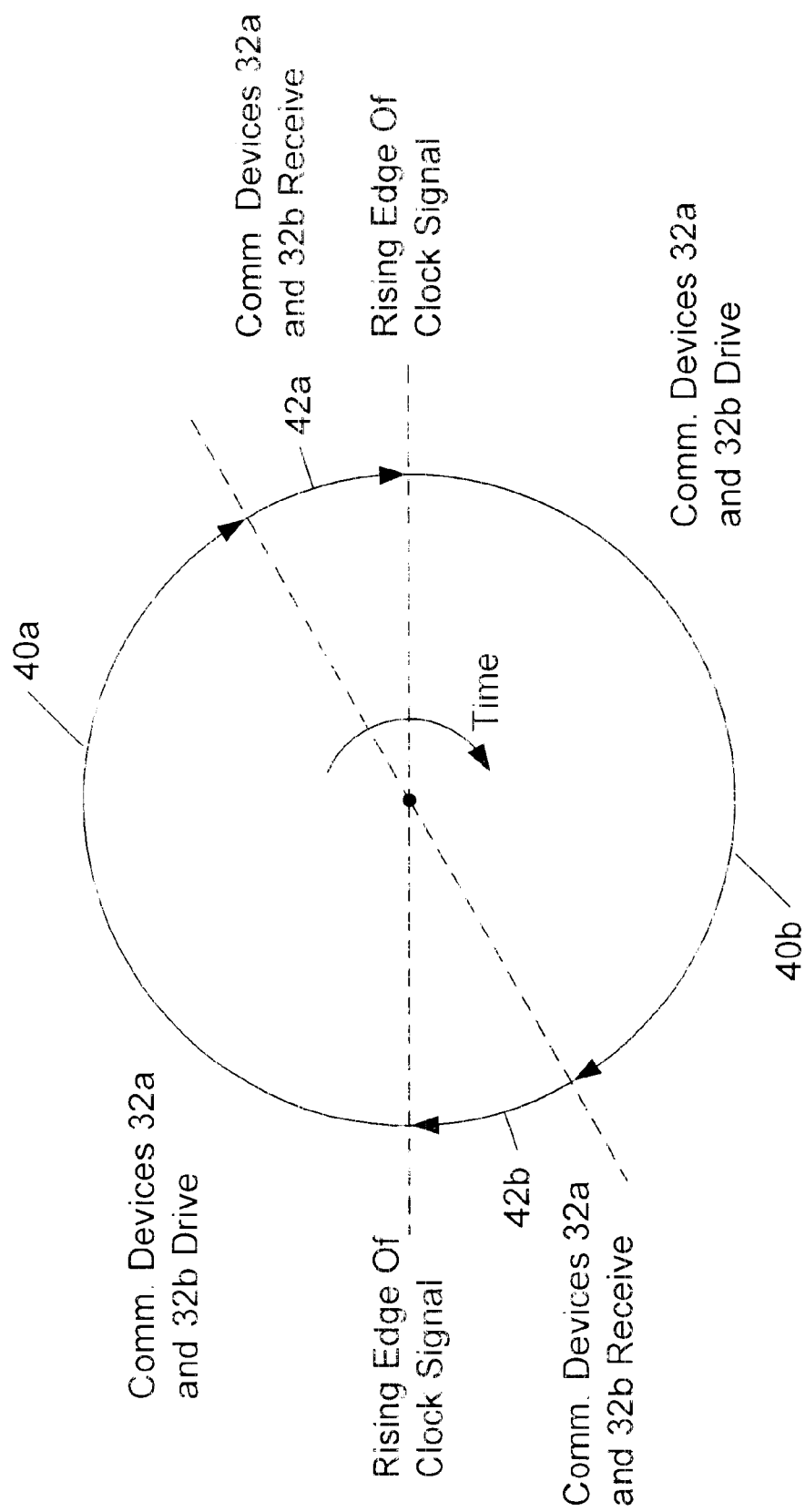
FIG. 5 is a diagram illustrating the cyclic nature of the simultaneous bidirectional data transmission method of the present invention and employed by the digital communication system of FIG. 4.

FIG. 5 is a diagram illustrating the cyclic nature of the simultaneous bidirectional data transmission method of the present invention and employed by digital communication system 30. Each cycle of the clock signal begins with a transition from a first voltage level "$V_1$" to a second voltage level "$V_2$" where $V_2 > V_1$ (i.e., a rising edge of the clock signal). During a first portion 40a of a first period of the clock signal, communication devices 32a–b may both drive an output data signal upon transmission line 34 via respective I/O drivers 36a–b and I/O terminals 38a–b. During a remaining portion 42a of the first clock signal period, communication devices 32a–b may both receive an input signal via respective I/O terminals 38a–b and I/O drivers 36a–b. During a first portion 40b of a second clock signal period, both communication devices 32a–b may drive an output data signal upon transmission line 34 via respective I/O drivers 36a–b and I/O terminals 38a–b. During a remaining portion 42b of the second clock signal period, communication devices 32a–b may both receive an input signal via respective I/O terminals 38a–b and I/O drivers 36a–b. The data transmission cycle may repeat itself with communication devices 32a and 32b simultaneously driving output data signals upon, and receiving input signals from, transmission line 34 during each period of the clock signal.

Figure 6:
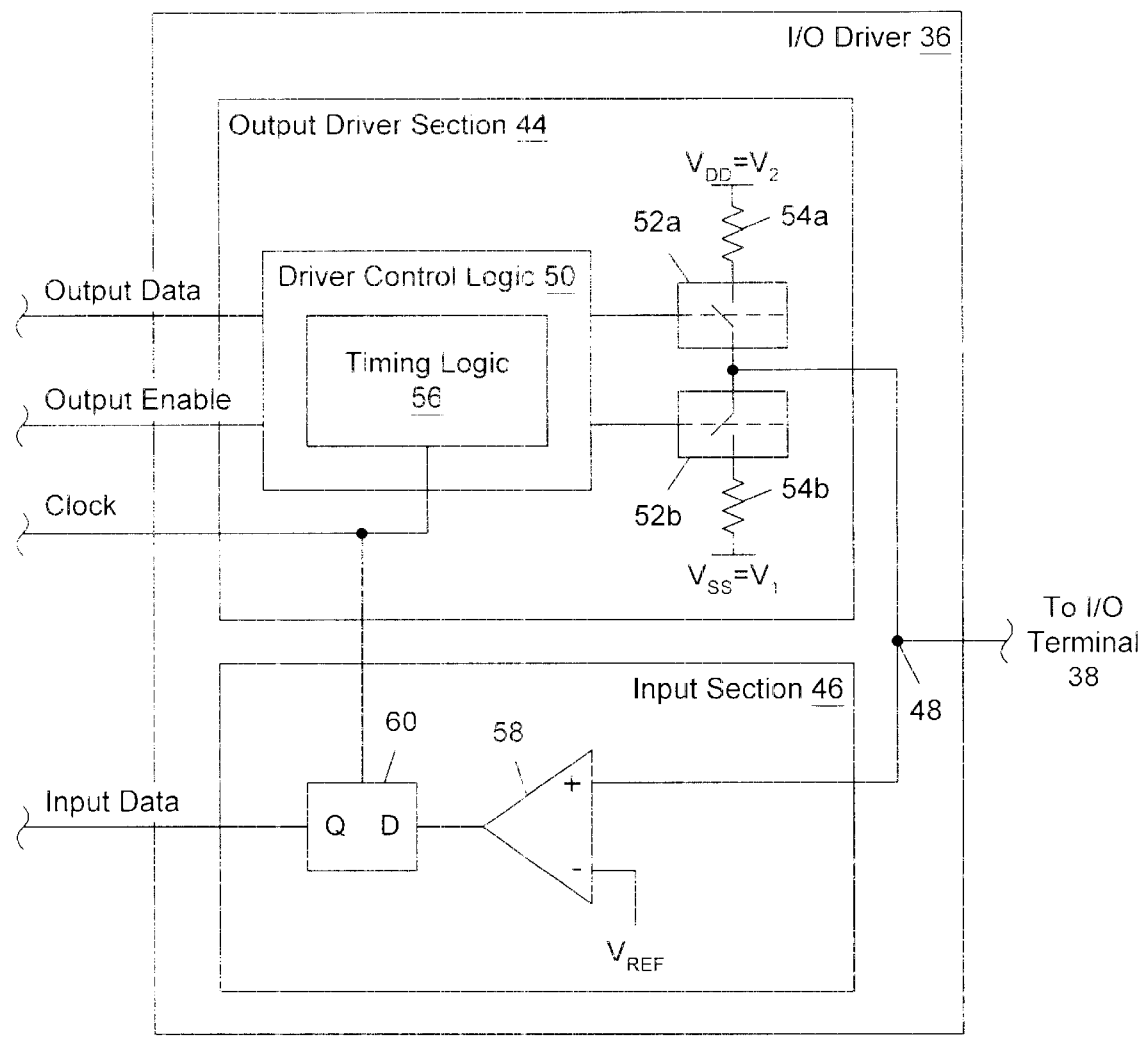
FIG. 6 is a diagram of one embodiment of the I/O driver of each communication device of FIG. 4.

FIG. 6 is a diagram of one embodiment of each I/O driver 36. Each I/O driver 36 includes an output driver section 44 and an input section 46 coupled to an I/O node 48. I/O node 48 is electrically connected to the corresponding I/O terminal 38 and to one end of transmission line 34. When data is to be transmitted, output driver section 44 receives an output data signal, an output enable signal, and the clock signal from the corresponding communication device 32. Output driver section 44 drives the output data signal upon I/O node 48 when the output enable signal is asserted and during the first portion of the period of the clock signal.

Input section 46 receives the input signal from I/O node 48 during the remainder of the period of the clock signal, derives an input data signal from the input signal, and provides the input data signal to the corresponding communication device 32.

In the embodiment of FIG. 6, output driver section 44 includes driver control logic 50, a first switching element 52a, a second switching element 52b, a first electrical resistor 54a, and a second electrical resistor 54b. First switching element 52a and first resistor 54a are coupled in series between I/O node 48 and a power supply potential "$V_{DD}$", where "$V_{DD}$" is equal to voltage level "$V_2$". First switching element 52a receives a first control signal from driver control logic 50. When the first control signal is asserted, first switching element 52a enters a high conductance state, electrically coupling I/O node 48 to power supply potential "$V_{DD}$" through first resistor 54a.

Second switching element 52b and second resistor 54b are coupled in series between I/O node 48 and a power supply potential "$V_{SS}$", where "$V_{SS}$" is equal to voltage level "$V_1$". Second switching element 52b receives a second control signal from driver control logic 50. When the second control signal is asserted, second switching element 52b enters a high conductance state, electrically coupling I/O node 48 to power supply potential "$V_{SS}$" through second resistor 54b. Switching elements 52 are preferably transistors, and more preferably metal oxide semiconductor (MOS) transistors.

In order to reduce signal reflections within transmission line 34, output driver section 44 preferably drives I/O node 48 with an output impedance substantially equal to characteristic impedance "$Z_O$" of transmission line 34. Thus the sum of the value of first resistor 54a and an internal resistance of first switching element 52a is preferably made substantially equal to characteristic impedance "$Z_O$". Similarly, the sum of the value of second resistor 54b and an internal resistance of second switching element 52b is preferably made substantially equal to characteristic impedance "$Z_O$". For example, the internal resistances of first switching element 52a and second switching element 52b may be made substantially equal to 0 ohms. In this case, first resistor 54a and second resistor 54b preferably have values substantially equal to characteristic impedance "$Z_O$". Conversely, the internal resistances of first switching element 52a and second switching element 52b may be made substantially equal to characteristic impedance "$Z_O$". In this case, first resistor 54a and second resistor 54b preferably have values substantially equal to 0 ohms.

When data is to be transmitted, output driver section 44 operates in a "drive" mode during the first portion of a period of the clock signal. Output driver section 44 operates in a "terminate" mode: (i) during the remainder of the clock signal period following data transmission, and (ii) when there is no data to be transmitted. When data is to be transmitted, driver control logic 50 generates the first and second control signals such that the output data signal is driven upon I/O node 48. The output data signal is driven upon I/O node 48 with an output resistance substantially equal to "$Z_O$".

In the terminate mode, output driver section 44 resistively "terminates" transmission line 34 to reduce signal reflections within transmission line 34. Driver control logic 50 asserts the first control signal placing first switching element 52a in the high conductance state, and first switching element 52a electrically couples I/O node 48 to the second voltage level "$V_2$" (i.e., power supply voltage $V_{DD}$) through first resistor 54a. In the terminate mode, first resistor 54a in series with the internal resistance of first switching element 52a resistively terminates transmission line 34 with a resistance value substantially equal to characteristic impedance "$Z_O$".

Driver control logic 50 includes timing logic 56. Timing logic 56 receives the periodic clock signal and produces an output signal. The output signal produced by timing logic 56 may be, for example, asserted for the first portion of the period of the clock signal and deasserted for the remainder of the period of the clock signal. Timing logic 56 may include, for example, a monostable multivibrator circuit triggered by the periodic transitions of the clock signal from "$V_1$" to "$V_2$". Driver control logic 50 generates the first and second control signals in response to the output signal produced by timing logic 56 such that first switching element 52a and second switching element 52b drive the output data signal upon I/O node 48 when the output signal produced by timing logic 56 is, asserted, and first switching element 52a electrically couples I/O node to power supply voltage $V_{DD}$ through first resistor 54a when the output signal is deasserted.

Input section 46 includes a differential amplifier 58 and a memory element 60. Differential amplifier 58 has a first input terminal coupled to I/O node 48 and a second input terminal coupled to a reference voltage "$V_{REF}$". The first input terminal receives the input signal from I/O node 48. Differential amplifier 58 produces an output signal at an output terminal dependent upon a voltage difference between the input signal and the reference voltage. When the input signal is greater than "$V_{REF}$", differential amplifier 58 produces an output voltage equal to voltage level "$V_2$". When the input signal is less than "$V_{REF}$", differential amplifier 58 produces an output voltage equal to voltage level "$V_1$" (i.e., a logic '0').

Memory element 60 receives the output signal produced by differential amplifier at an input data terminal and the clock signal at a control terminal. When the clock signal transitions from "$V_1$" to "$V_2$", memory element 60 stores the output signal produced by differential amplifier 58 and produces the output signal as the input data signal at an output terminal. The input data signal is coupled to the corresponding communication device 32.

A method for achieving simultaneous bidirectional data transmission includes coupling first and second communication devices, each responsive to a periodic clock signal, to opposite ends of a transmission line. The first and second communication devices are then configured to simultaneously: (i) drive an output data signal upon the transmission line during a first portion of a period of the clock signal, and (ii) receive an input data signal from the transmission line during a remainder of the period of the clock signal.

Figure 7:
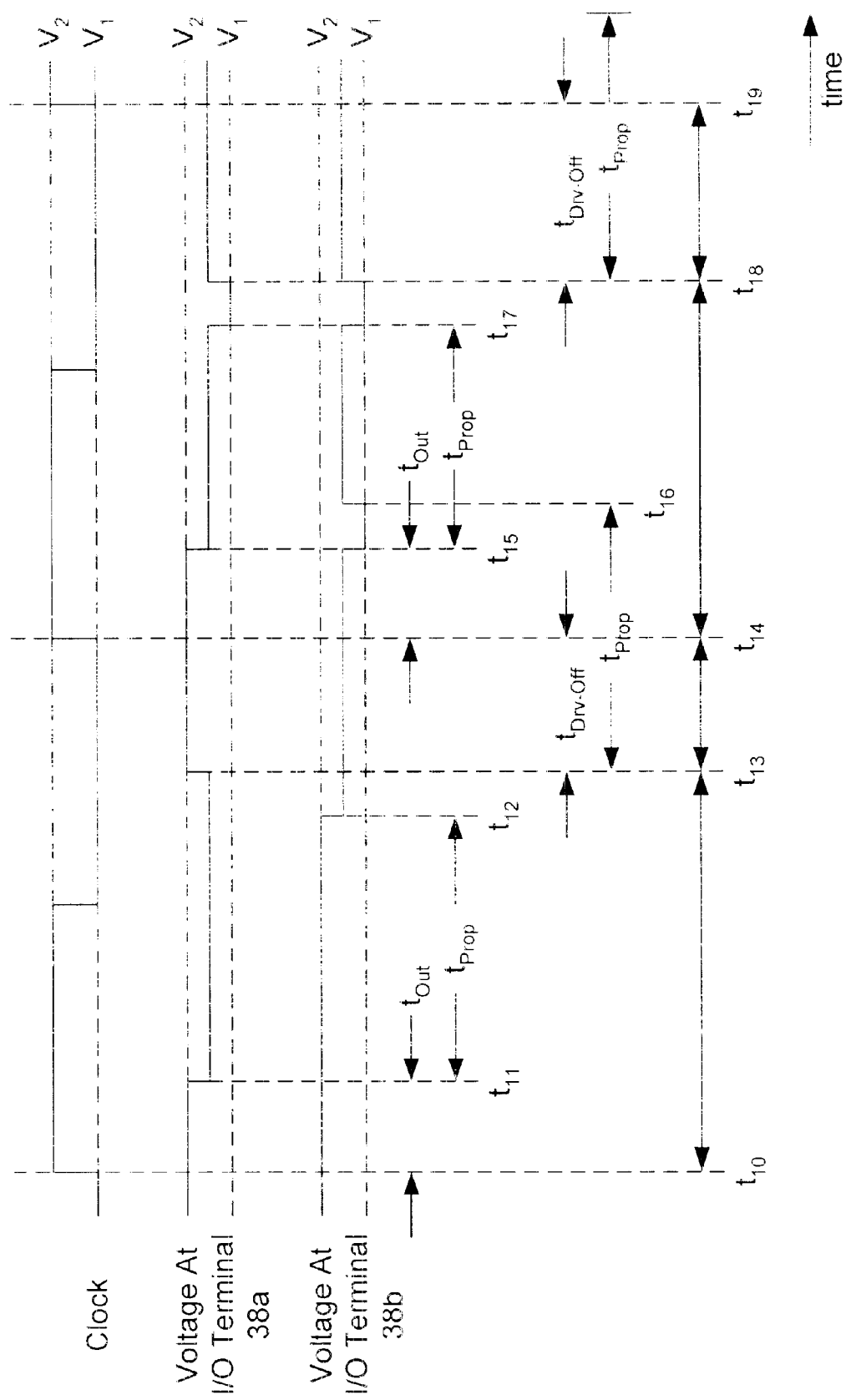
FIG. 7 is a timing diagram illustrating exemplary voltage levels within the digital communication system of FIG. 4.

FIG. 7 is a timing diagram illustrating exemplary voltage levels within digital communication system 30 employing the present simultaneous bidirectional data transmission method. At a time "$t_{10}$" in FIG. 7, the clock signal transitions from voltage level "$V_1$" to voltage level "$V_2$", beginning a first clock signal period. During a first portion of the first clock signal period, communication device 32a drives one end of transmission line 34 with voltage level "$V_1$" (e.g., a logic '0') via I/O driver 36a and I/O terminal 38a, and communication device 32b drives the other end of transmission line 34 with voltage level "$V_2$" (e.g., a logic '1') via I/O driver 36b and I/O terminal 38b.

I/O drivers 36a–b cannot drive respective I/O terminals 38a–b immediately, and an output delay time "$t_{OUT}$" results. At a time "$t_{11}$", delayed from time "$t_{10}$" by "$t_{OUT}$", the voltage level at I/O terminal 38a drops from voltage level "$V_2$" (e.g., $V_{DD}$) to midway between voltage levels "$V_1$" and "$V_2$" as driver 36a drives I/O terminal 38a. The voltage level at I/O terminal 38b remains at the initial voltage level "$V_2$".

Propagation delay time "$t_{PROP}$" is required for the signals driven upon transmission line 34 to travel from one end of transmission line 34 to the other. At time "$t_{12}$", delayed from time "$t_{11}$" by "$t_{PROP}$", the signal launched upon transmission line 34 by communication device 32a arrives at I/O terminal 38b, and the signal launched upon transmission line 34 by communication device 32b arrives at I/O terminal 38a. I/O terminal 38b remains at the voltage level midway between voltage levels "$V_1$" and "$V_2$", and I/O terminal 38b assumes the voltage level midway voltage levels "$V_1$" and "$V_2$".

A time "$t_{13}$" begins a time period "$t_{DRV\_OFF}$" (i.e., a remainder of the first clock signal period). During time period "$t_{DRV\_OFF}$", communication devices 32a–b are in a receive mode and do not drive respective I/O terminals 38a–b. At time "$t_{13}$", output driver sections 44 of I/O drivers 36a–b switch from the drive mode to the terminate mode. Time period "$t_{DRV\_OFF}$" immediately precedes the next transition of the clock signal from "$V_1$" to "$V_2$" (i.e., the next rising edge of the clock signal).

During time period "$t_{DRV\_OFF}$", output driver sections 44 electrically couple I/O terminals 38 to voltage level "$V_2$". As output driver 44 of communication device 32a stops driving I/O terminal 38a to voltage level "$V_1$" and electrically couples I/O terminal to voltage level "$V_2$", the voltage level at I/O pad 38a goes from the voltage level midway between voltage levels "$V_1$" and "$V_2$" to voltage level "$V_2$" at time "$t_3$". Output driver 44 of communication device 32b stops driving I/O terminal 38b to voltage level "$V_2$" and electrically couples I/O terminal 38b to voltage level "$V_2$" at time "$t_{13}$". As a result, the voltage level at I/O pad 38b does not change during time period "$t_{DRV\_OFF}$" as shown in FIG. 7.

During time period "$t_{DRV\_OFF}$", differential amplifiers 58 within I/O drivers 36 of communication devices 32a–b compare the voltage levels present upon respective I/O terminals 38 (and I/O nodes 48) to reference voltage "$V_{REF}$" as described above. Since the voltage level of I/O terminal 38a remains at voltage level "$V_2$" during time period "$t_{DRV\_OFF}$", and voltage level "$V_2$" is greater than "$V_{REF}$", differential amplifier 58 within I/O driver 36a produces output voltage level "$V_2$" (e.g., a logic '1'). Differential amplifier 58 within I/O driver 36b produces voltage level "$V_1$" (e.g., a logic '0') as the voltage level of I/O terminal 38b during time period "$t_{DRV\_OFF}$" remains midway between "$V_1$" and "$V_2$" and less than "$V_{REF}$".

At a time "$t_{14}$" following "$t_{13}$", a rising edge of the clock signal occurs, ending time period "$t_{DRV\_OFF}$" and beginning a second clock signal period. At time "$t_{14}$", input sections 46 of I/O drivers 36a–b latch the output signals produced by the respective internal differential amplifiers 58 and provide the output signals to respective communication devices 32a–b as input data signals.

It is noted that the voltage level "$V_2$" received by I/O driver 36a of communication device 32a at the end of the first clock signal period matches the voltage level driven upon transmission line 34 by I/O driver 36b of communication device 32b at the beginning of the first clock signal period. It is also noted that the voltage level "$V_1$" received by I/O driver 36b of communication device 32b at the end of the first clock signal period matches the voltage level driven upon transmission line 34 by I/O driver 36a of communication device 32a at the beginning of the first clock signal period.

During a first portion of the second clock signal period, communication device 32a drives one end of transmission line 34 to voltage level "$V_1$" (e.g., a logic '0') via I/O driver 36a and I/O terminal 38a, and communication device 32b drives the other end of transmission line 34 to voltage level "$V_1$" via I/O driver 36b and I/O terminal 38b. At a time "$t_{15}$", delayed from time "$t_{14}$" by "$t_{OUT}$", the voltage level at I/O terminal 38a drops from voltage level "$V_2$" (e.g., $V_{DD}$) to the voltage level midway between voltage levels "$V_1$" and "$V_2$" as I/O driver 36a begins driving I/O terminal 38a. The voltage level at I/O terminal 38b drops from the voltage level midway between "$V_1$" and "$V_2$" to voltage level "$V_1$".

At a time "$t_{16}$", delayed from time "$t_{13}$" by "$t_{PROP}$", the voltage level at I/O terminal 38b changes from voltage level "$V_1$" to midway between voltage levels "$V_1$" and "$V_2$" as the voltage level change introduced at I/O terminal 38a at time "$t_{13}$" arrives at I/O terminal 38b.

At a time "$t_{17}$", delayed from time "$t_{15}$" by "$t_{PROP}$", the voltage levels at I/O terminals 38 drop from midway between voltage levels "$V_1$" and "$V_2$" to voltage level "$V_1$"

as the voltage level change introduced at I/O terminal 38a at time "$t_{15}$" arrives at I/O terminal 38b, and the voltage level change introduced at I/O terminal 38b at time "$t_{15}$" arrives at I/O terminal 38a.

A time "$t_{18}$" begins a second "$t_{DRV\_OFF}$" time period (i.e., a remainder of the second clock signal period). At time "$t_{18}$", output driver sections 44 of I/O drivers 36a–b switch from the drive mode to the terminate mode. Time period "$t_{DRV\_OFF}$" immediately precedes the next transition of the clock signal from "$V_1$" to "$V_2$" (i.e., the next rising edge of the clock signal).

During time period "$t_{DRV\_OFF}$", output driver sections 44 electrically couple I/O terminals 38 to voltage level "$V_2$". Output driver 44 of communication device 32a stops driving I/O terminal 38a to voltage level "$V_1$" and electrically couples I/O terminal 38a to voltage level "$V_2$" at time "$t_{18}$". As a result, the voltage level at I/O pad 38a goes from voltage level "$V_1$" to the voltage level midway between "$V_1$" and "$V_2$". Similarly, Output driver 44 of communication device 32b stops driving I/O terminal 38b to voltage level "$V_1$" and electrically couples I/O terminal 38b to voltage level "$V_2$". As a result, the voltage level at I/O pad 38b also goes from voltage level "$V_1$" to the voltage level midway between "$V_1$" and "$V_2$" at time "$t_{18}$".

At a time "$t_{19}$" following "$t_{18}$", a rising edge of the clock signal occurs, beginning a third clock signal period. At time "$t_{19}$", I/O drivers 36a–b latch the output signals produced by the respective internal differential amplifiers 58 and provide the output signals to respective communication devices 32a–b as input data signals received from the other communication device via transmission line 34. Since the voltage levels of I/O terminals 38a–b are midway between voltage levels "$V_1$" and "$V_2$" and less than "$V_{REF}$" during time period "$t_{DRV\_OFF}$", differential amplifiers 58 within I/O drivers 36a–b both produce voltage level "$V_1$".

It is noted that the voltage level "$V_1$" received by I/O driver 36a of communication device 32a at the end of the second clock signal period matches the voltage level driven upon transmission line 34 by I/O driver 36b of communication device 32b at the beginning of the second clock signal period. It is noted that the voltage level "$V_1$" received by I/O driver 36b of communication device 32b at the end of the second clock signal period matches the voltage level driven upon transmission line 34 by I/O driver 36a of communication device 32a at the beginning of the second clock signal period.

FIG. 7 reveals several timing requirements which must be observed in order to achieve simultaneous bidirectional data transmission in accordance with the present invention. First, an output delay time "$t_{OUT}$" is required for output driver section 44 of I/O driver 36 to drive I/O node 48. As described above, a propagation delay time "$t_{PROP}$" is required for a signal to travel from one end of transmission line 34 to the other. In order for a signal driven upon one end of transmission line 34 to reach the other end during the first portion of the clock signal period, the first portion of the clock signal period must be greater than or equal to the sum of the output delay time "$t_{OUT}$" and the propagation delay time "$t_{PROP}$". The clock signal period is the sum of the first portion and the remainder, where the remainder is time period "$t_{DRV\_OFF}$". Thus the clock signal period must be greater than or equal to the sum of the output delay time "$t_{OUT}$", the propagation delay time "$t_{PROP}$", and time period "$t_{DRV\_OFF}$".

It is contemplated input section 46 of I/O driver 36 may require a "setup" time period immediately prior to the rising edge of the clock signal during which the input signal at I/O node 48 must be substantially constant. The setup time must be observed in order for input section 46 to correctly produce the input data signal. Accordingly, the remainder of the period of the clock signal (i.e., time period "$t_{DRV\_OFF}$") must be greater than or equal to any required setup time of input section 46 of I/O driver 36.

It is also likely that the clock signal provided to, or generated by, communication device 32a May be advanced or delayed in time from the rising edges of the clock signal provided to, or generated by, communication device 32b. For example, communication devices 32a–b may be coupled to receive the clock signal via a clock signal line. A difference in the arrival times of the clock signal at communication devices 32a and 32b is termed clock "skew". Alternately, each communication device 32 may generate separate clock signals, and may include circuitry to synchronize the two separate clock signals. In this case, an advance or delay of one clock signal with respect to the other is termed clock "jitter". It is noted that time period "$t_{DRV\_OFF}$" must be greater than or equal to the sum of any required setup time period of input section 46 of I/O driver 36 and any clock skew or jitter.

It is also contemplated input section 46 of I/O driver 36 may require a "hold" time period immediately following the rising edge of the clock signal during which the input signal at I/O node 48 must be substantially constant. Like the setup time, the hold time must be observed in order for input section 46 to correctly produce the input data signal. In order for input section 46 to produce the input data signal before the output data signal is driven upon I/O node 48 by output driver section 44, the output delay time "$t_{OUT}$" of output driver section 44 must be greater than any required hold time of input section 46.

In order for the input signal at I/O node 48 to be substantially constant during the setup and hold times of input section 46, propagation delay time "$t_{PROP}$" of transmission line 34 must be greater than the sum of the remainder of the period of the clock signal (i.e., time period "$t_{DRV\_OFF}$") and the hold time of input section 46.

It will be appreciated by those skilled in the art having the benefit of this disclosure that this invention is believed to be a data transmission system and method allowing each of a pair of communication devices coupled to a transmission line to both transmit and receive data during each cycle of a clock signal (i.e., simultaneous bidirectional data transmission). Furthermore, it is also to be understood that the form of the invention shown and described is to be taken as exemplary, presently preferred embodiments. Various modifications and changes may be made without departing from the spirit and scope of the invention as set forth in the claims. It is intended that the following claims be interpreted to embrace all such modifications and changes.

What is claimed is:

1. A digital communication system, comprising:

first and second communication devices coupled to opposite ends of a transmission line and operating in response to a periodic clock signal, wherein the first and second communication devices are configured to simultaneously: (i) drive an output data signal upon the transmission line during a first portion of a period of the clock signal, and (ii) receive an input signal from the transmission line during a remainder of the period of the clock signal;

wherein the first and second communication devices each include an input/output driver circuit comprising:

an input/output node coupled to the transmission line; and an output driver coupled to the input/output node, wherein the output driver is configured to drive the output signal upon the input/output node during the first portion of the period of the clock signal, and is further configured to resistively terminate the transmission line during a second portion of the period of the clock signal.

2. The digital communication system as recited in claim 1, wherein each input/output driver circuit further includes:

an input section coupled to the input/output node and configured to: (i) receive the input signal from the input/output node during the remainder of the period of the clock signal, and (ii) produce an input data signal derived from the input signal.

3. The digital communication system as recited in claim 2, wherein the output driver section is coupled to receive the output data signal and the clock signal, and wherein the output driver section is configured to: (i) drive the output data signal upon the input/output node during the first portion of the period of the clock signal, and (ii) electrically couple the input/output node to a power supply voltage through an electrical resistance during the remainder of the period of the clock signal.

4. The digital communications system as recited in claim 3, wherein the output driver includes a first switching device and a second switching device, wherein the first switching device is coupled to a first resistor, and the second switching device is coupled to a second resistor.

5. The digital communications system as recited in claim 4, wherein the first resistor is further coupled to a first node of a power supply, the first node having a first voltage potential, and the second resistor is further coupled to a second node of the power supply, the second node having a second voltage potential.

6. The digital communications system as recited in claim 5, wherein a sum of the resistance of the first resistor and an internal resistance of the first switching device is substantially equal to a characteristic impedance of the transmission line.

7. The digital communications system as recited in claim 5, wherein a sum of the resistance of the second resistor and an internal resistance of the second switching device is substantially equal to a characteristic impedance of the transmission line.

8. The digital communication system as recited in claim 2, wherein the output driver section and the input section are responsive to periodic transitions in the clock signal from a first voltage level to a second voltage level, and wherein the second voltage level is greater than the first voltage level.

9. The digital communication system as recited in claim 8, wherein an output delay time is required for the output driver section to drive the output data signal upon the input/output node, and wherein a propagation delay time is required for a signal to travel from one end of the transmission line to the other.

10. The digital communication system as recited in claim 9, wherein the first portion of the period of the clock signal is greater than or equal to the sum of the output delay time and the propagation delay time.

11. The digital communication system as recited in claim 9, wherein the input signal must be substantially constant at the input/output node for a setup time immediately before each clock signal transition in order for the input section to produce the input data signal.

12. The digital communication system as recited in claim 11, wherein the remainder of the period of the clock signal is greater than or equal to the setup time.

13. The digital communication system as recited in claim 11, wherein the period of the clock signal is greater than or equal to the sum of the output delay time, the propagation delay time, and the setup time.

14. The digital communication system as recited in claim 9, wherein the input signal must be substantially constant at the input/output node for a hold time immediately following each clock signal transition in order for the input section to produce the input data signal.

15. The digital communication system as recited in claim 14, wherein the output delay time is greater than the hold time.

16. The digital communication system as recited in claim 14, wherein the propagation delay time is greater than the sum of the remainder of the period of the clock signal and the hold time.

17. A method for achieving simultaneous bidirectional data transmission, comprising:

coupling first and second communication devices to opposite ends of a transmission line;

configuring the first and second communication devices to respond to a periodic clock signal and to simultaneously: (i) drive an output data signal upon the transmission line during a first portion of a period of the clock signal, (ii) receive an input signal from the transmission line during a remainder of the period of the clock signal; and (iii) resistively terminate the transmission line during the remainder of the period of the clock signal.

18. An input/output driver circuit, comprising:

an input/output node coupled to a transmission line; and an output driver section coupled to the input/output node and to receive an output data signal and a periodic clock signal, wherein the output driver section is configured to: (i) drive the output data signal upon the input/output node during a first portion of a period of the clock signal, and (ii) electrically couple the input/output node to a power supply voltage through an electrical resistance during a remainder of the period of the clock signal, wherein the output driver section includes:

a first switching element coupled to the input/output node;

a first electrical resistance coupled between the first switching element and a first power supply voltage;

a second switching element coupled to the input/output node; and a second electrical resistance coupled between and the second switching element and a second power supply voltage.

19. The input/output driver circuit as recited in claim 18, wherein the output driver section operates in a drive mode during the first portion of the period of the clock signal and operates in a terminate mode during the remainder of the period of the clock signal.

20. The input/output driver circuit as recited in claim 18, wherein the output driver section comprises:

driver control logic coupled to receive the output data signal and the periodic clock signal, wherein the driver control logic is configured to produce first and second control signals, wherein the driver control logic generates the first and second control signals such that the first and second switching elements: (i) drive the output data signal upon the input/output node during the first portion of the period of the clock signal, and (ii) electrically couple the input/output node to the first power supply voltage through the first electrical resistance during the remainder of the period of the clock signal;

wherein the first switching element is coupled to receive the first control signal and configured to electrically couple the input/output node to the first power supply voltage through the first electrical resistance in response to the first control signal;

wherein the second switching element is coupled to receive the second control signal and configured to electrically couple the input/output node to the second power supply voltage through the second electrical resistance in response to the second control signal.

21. The input/output driver circuit as recited in claim 20, wherein the driver control logic includes timing logic coupled to receive the periodic clock signal and configured to produce an output signal which is asserted for the first portion of the period of the clock signal.

22. The input/output driver circuit as recited in claim 21, wherein the timing logic is triggered by periodic transitions of the clock signal from a first voltage level to a second voltage level.

23. The input/output driver circuit as recited in claim 21, wherein the driver control logic generates the first and second control signals in response to the timing logic output signal such that the first and second switching elements: (i) drive the output data signal upon the input/output node when the timing logic output signal is asserted, and (ii) electrically couple the input/output node to the first power supply voltage through the first electrical resistance when the timing logic output signal is deasserted.

24. The input/output driver circuit as recited in claim 20, wherein a sum of an internal resistance of the first switching element and the first electrical resistance is substantially equal to a characteristic impedance of the transmission line.

25. The input output driver circuit as recited in claim 20, wherein a sum of an internal resistance of the second switching element and the second electrical resistance is substantially equal to a characteristic impedance of the transmission line.

26. The input/output driver circuit as recited in claim 18, further comprising an input section including:

a differential amplifier having a first input terminal coupled to the input/output node and receiving the input signal and a second input terminal coupled to receive a reference voltage, wherein the differential amplifier is configured to produce an output signal dependent upon a voltage difference between the input signal and the reference voltage; and a memory element coupled to receive the output signal and the clock signal, wherein during a transition of the clock signal from a first voltage level to a second voltage level, the memory element is configured to store the output signal and to provide the output signal as the input data signal at an output terminal.

27. A digital communication system, comprising:

first and second communication devices coupled to opposite ends of a transmission line and operating in response to a periodic clock signal, wherein the first and second communication devices are configured to simultaneously: (i) drive an output data signal upon the transmission line during a first portion of a period of the clock signal, and (ii) receive an input signal from the transmission line during a remainder of the period of the clock signal;

an input/output node operably coupled to the transmission line;

an output driver section coupled to the input/output node and configured to drive the output data signal upon the input/output node during the first portion of the period of the clock signal;

an input section coupled to the input/output node and configured to: (i) receive the input signal from the input/output node during the remainder of the period of the clock signal, and (ii) produce an input data signal derived from the input signal; and wherein the output driver section is coupled to receive the output data signal and the clock signal, and wherein the output driver section is configured to: (i) drive the output data signal upon the input/output node during the first portion of the period of the clock signal, and (ii) electrically couple the input/output node to a power supply voltage through an electrical resistance during the remainder of the period of the clock signal.

* * * * *